(12) United States Patent
Kerrom et al.

(10) Patent No.: US 9,500,504 B2
(45) Date of Patent: Nov. 22, 2016

(54) MEASURING TUBE FOR A FLOW MEASURING DEVICE

(71) Applicant: Endress + Hauser Flowtec AG, Reinach (CH)

(72) Inventors: Roger Kerrom, Lorrach (DE); Beat Tschudin, Reinach (CH); Raphael Hess, Reinach (CH)

(73) Assignee: Endress + Hauser Flowetec AG, Reinach (CH)

( * ) Notice: Subject to any disclaimer, the term of this patent is extended or adjusted under 35 U.S.C. 154(b) by 0 days.

(21) Appl. No.: 14/396,497

(22) PCT Filed: Mar. 19, 2013

(86) PCT No.: PCT/EP2013/055633
§ 371 (c)(1),
(2) Date: Oct. 23, 2014

(87) PCT Pub. No.: WO2013/160020
PCT Pub. Date: Oct. 31, 2013

(65) Prior Publication Data
US 2015/0114133 A1    Apr. 30, 2015

(30) Foreign Application Priority Data
Apr. 26, 2012    (DE) .......... 10 2012 103 685

(51) Int. Cl.
*G01F 1/58*    (2006.01)
*G01F 15/00*    (2006.01)
*G01F 15/18*    (2006.01)
(Continued)

(52) U.S. Cl.
CPC . *G01F 1/58* (2013.01); *F16L 9/02* (2013.01); *F16L 23/16* (2013.01); *G01F 1/586* (2013.01); *G01F 1/588* (2013.01); *G01F 15/006* (2013.01); *G01F 15/18* (2013.01)

(58) Field of Classification Search
CPC ............... G01F 1/56; G01F 1/58; G01F 1/60
USPC ............................ 73/861.11, 861.08, 861.12
See application file for complete search history.

(56) References Cited

U.S. PATENT DOCUMENTS

| | | | |
|---|---|---|---|
| 811,000 A | | 1/1906 | Tompkins |
| 3,213,685 A | * | 10/1965 | Mannherz ............... G01F 1/58 174/153 R |
| 4,288,105 A | | 9/1981 | Press |

(Continued)

FOREIGN PATENT DOCUMENTS

| | | |
|---|---|---|
| CH | 519675 | 3/1971 |
| DE | 2636459 A1 | 2/1978 |

(Continued)

OTHER PUBLICATIONS

International Search Report, EPO, The Netherlands, Aug. 27, 2013.
(Continued)

*Primary Examiner* — Jewel V Thompson
(74) *Attorney, Agent, or Firm* — Bacon & Thomas, PLLC (57) ABSTRACT

A measuring tube for a flow measuring device, wherein the measuring tube has a lining, wherein the lining has at least one sealing lip, which sealing lip serves to provide a sealing action between the measuring tube and a pipeline section adjoining the measuring tube in the installed state.

16 Claims, 4 Drawing Sheets

(51) Int. Cl.
*F16L 9/02* (2006.01)
*F16L 23/16* (2006.01)

(56) References Cited

U.S. PATENT DOCUMENTS

| | | |
|---|---|---|
| 6,260,854 B1 | 7/2001 | Lemon |
| 2004/0149046 A1* | 8/2004 | Yamazaki .............. G01F 1/588 73/861.12 |
| 2009/0178489 A1* | 7/2009 | Iijima .................... G01F 1/58 73/861.11 |
| 2009/0188327 A1* | 7/2009 | Shanahan .............. G01F 1/588 73/861.08 |
| 2009/0293635 A1* | 12/2009 | Iijima .................... G01F 1/58 73/861.11 |
| 2011/0314931 A1* | 12/2011 | Iijima ................... G01F 1/588 73/861.12 |
| 2015/0377666 A1* | 12/2015 | Rovner ................. G01F 1/586 73/861.12 |

FOREIGN PATENT DOCUMENTS

| | | |
|---|---|---|
| DE | 4000799 A1 | 7/1991 |
| DE | 4122226 A1 | 1/1993 |
| DE | 19846475 A1 | 4/2000 |
| DE | 102006015074 B4 | 10/2007 |
| JP | 55069019 A | 5/1980 |
| JP | 62035224 A | 2/1987 |
| JP | 2002039821 A | 2/2002 |

OTHER PUBLICATIONS

German Search Report, German PTO, Munich, Feb. 5, 2013.
European Patent Office Search Report, Munich, DE, Jun. 6, 2016.

* cited by examiner

MEASURING TUBE FOR A FLOW MEASURING DEVICE

TECHNICAL FIELD

The invention relates to a measuring tube for a flow measuring device. Furthermore, the invention relates to a magneto inductive, flow measuring device. The invention also relates further to a sealing ring free, flange connection and to a method for manufacturing a measuring tube for a flow measuring device.

BACKGROUND DISCUSSION

It is known from the state of the art to use a measuring tube for determining flow. A measuring transducer secured to the measuring tube or integrated into the measuring tube serves, in such case, to register a measured variable related to the flow through the measuring tube.

Known from the state of the art are different measuring principles for determining flow through such a measuring tube. Thus determining the flow can occur, for example, based on the ultrasonic measuring principle or based on the magneto inductive measuring principle.

Due to the different applications in which such flow measuring devices are applied, it is necessary to line the measuring tube with an electrically insulating material. This lining is selected as a function of the temperature and the measured material present in a particular application. Examples of materials include thermoplastic, thermosetting and elastomeric, synthetic materials.

Flow measuring devices are used by inserting them into pipelines. In such case, the measuring tube is connected at its two ends via flange connections with the adjoining pipeline sections. Known from the state of the art for sealing such flange connections are various kinds of seals. Thus, for example, Offenlegungsschrift (laid open German patent application DE 19846475 A1 discloses a flat sealing ring for establishing a flange connection. Further known from U.S. pat. No. US811,000 is a sealing ring, which serves for sealing a flange connection between two adjoining sections of a pipeline.

These known sealing surface geometries often require a high bearing pressure, in order to achieve adequate sealing. The high bearing pressure means, in turn, high bolt forces, which, lead to concentrated forces on the flanges. In order to keep flange warping small, the flanges must be correspondingly hefty, i.e. have a significant thickness.

Additionally, insertion of a sealing ring between two mutually adjoining pipeline sections provides the opportunity for gaps enabling escape of material at the joint.

SUMMARY OF THE INVENTION

It is, consequently, an object of the present invention to provide an improved sealing between measuring tubes and adjoining pipeline sections.

The object is achieved according to the invention by a measuring tube, a magneto inductive, flow measuring device, a sealing ring free, flange connection and a method for manufacturing a measuring tube for a flow measuring device.

As regards the measuring tube, the object is achieved by a measuring tube for a flow measuring device, wherein the measuring tube has a lining, wherein the lining has at least one sealing lip, which serves to provide a sealing action between the measuring tube and a pipeline section adjoining the measuring tube in the installed state.

It is thus an idea of the invention to use the lining of a measuring tube for a flow measuring device to provide a sealing action between the measuring tube and an adjoining pipeline. To this end, at least one sealing lip is part of the lining. Such a lining (with integrated sealing lip) of a measuring tube has the advantage that an additional sealing ring can be omitted.

In a form of embodiment of the measuring tube, the lining and the sealing lip, especially when the measuring tube is connected with the adjoining pipeline section, serve to produce the sealing action essentially by exerting a bearing pressure against the adjoining pipeline section. The proposed seal serves thus to prevent the escape of the measured substance, such as a liquid or a gas. Thus, this form of embodiment of the invention provides a measured material contacting, static seal.

Lining and/or sealing lip are, in such case, so designed that through bearing force on the sealing surfaces an effective pressure arises, which corresponds at least to the pressure of the measured material to be sealed. The assembly should thus prestress the lining and the sealing lip serving as seal with a minimum bearing pressure, respectively minimum pressing force, so that a sufficiently elastic and plastic adapting of the sealing surfaces to one another is achieved. In such case, however, a maximum allowable compressive force should not be exceeded, since otherwise the seal could be damaged.

In an additional form of embodiment of the measuring tube, the measuring tube includes at least one flange, which serves for connection of the measuring tube with the adjoining pipeline section, wherein the lining covers at least a part of the flange and the at least one sealing lip is located in a part of the lining covering the flange. Such a seal held on the flange serves as a form of gasket. The sealing action can be effected, in such case, by the pressing force applied, for example, by means of connection bolts, which serve for connecting a respective flange of the measuring tube with a counterflange of the adjoining pipeline section. In this form of embodiment, the lining extends not only on the inner wall of the measuring tube, but, instead, also on at least a part of a flange of the measuring tube. The at least one sealing lip can be provided in the part of the flange covered by the lining. Since measuring tubes, as is the practice in the state of the art, are clamped between two pipeline sections, the proposed measuring tube can have flanges on both of its ends, with each flange being provided with a sealing lip in the region in which the lining is present on the flange. Thus, when previously and in the following, one flange on one end of the measuring tube was, respectively is, discussed, it is understood that such can be extended to each of the flanges of a measuring tube having flanges on both of its ends.

In an additional form of embodiment of the measuring tube, the flange includes a first area, preferably a planar area, which is free of lining and which serves as a stop for a counterflange of the adjoining pipeline section. The stop can prevent a pressing of the seal beyond a maximum predetermined prestress.

In an additional form of embodiment of the measuring tube, the flange includes a second area, especially preferably a planar area, which is connected with the stop preferably via a shoulder, covered by the lining and offset from the first area preferably in the direction of the measuring tube axis. The area, which serves as stop and is free of lining and the area covered by lining provide a separating of the functions of the flange connection: On the one hand, the flange connection can serve for clamping the measuring tube between two pipeline sections, and, on the other hand, the flange connection can serve for sealing the connection between these pipeline sections. The first and second areas of the flange are preferably planar surfaces, which are essentially perpendicular to the measuring tube axis. Furthermore, the first area serving as stop permits pre-determining a maximum compression or maximum deformation of the sealing lip. Additionally, the height of the step and the amount of material of the lining, respectively the size of the sealing lip, can be adapted relative to one another, in order to achieve an optimal sealing action.

In an additional form of embodiment of the measuring tube, the lining and/or the sealing lip protrudes at least partially above a height in the direction of the measuring tube axis predetermined by the first area. The predetermined height is given, for example, by the intersection between the first area, respectively an imaginary continuation of the first area, and the measuring tube axis. The lining extends, in such case, (only) on the second area offset along the measuring tube axis relative to the first area. The proposed form of embodiment can provide a sealing action even when the tightening forces are not at their predetermined magnitude.

In an additional form of embodiment of the measuring tube, the flange includes an end face, which is at least partially covered by the lining, wherein the sealing lip protrudes outwards from the lining on the end face. Preferably, thus the sealing lip extends outwardly, i.e. in the direction of the adjoining pipeline section, from this end face. This protruding part serving as sealing lip can be elastically and/or plastically deformed in the case of the adapting or pressing of the flange connection, so that a sealing action is achieved between the sealing surfaces of the flanges.

In an additional embodiment of the measuring tube, the at least one sealing lip has an essentially circularly shaped cross section. However, also other sealing lip geometries are possible. For example, also a Christmas tree like structure of the sealing lip formed through undercuts, respectively a plurality of sealing lips, provides an option.

In an additional form of embodiment of the measuring tube, the at least one sealing lip is a component of the lining. Sealing lip and lining are joined with one another, for example, by material bonding.

In an additional embodiment of the measuring tube, the sealing lip is composed of the same material as the lining. Thus, a large number of the materials, such as, for example, polyurethane, Teflon, natural rubber, hard rubber, currently used for linings can also be used as sealing material.

In an additional embodiment of the measuring tube, a plurality of sealing lips, especially annular sealing lips, are provided. In this way, a plurality of sealing stages can be formed. Especially, an option is to adapt the size of sequentially following sealing lips to one another, so that, for example, with increasing separation from the measuring tube axis, the size of the sealing lips decreases.

In an additional form of embodiment of the measuring tube, a first sealing lip and a second sealing lip are provided, which are spaced with different separations from the measuring tube axis, wherein preferably the second sealing lip is spaced farther from the measuring tube axis than the first sealing lip.

In an additional form of embodiment of the measuring tube, the maximum diameter of the first sealing lip is greater than the maximum diameter of the second sealing lip.

In an additional form of embodiment of the measuring tube, the sealing lips form annular corrugations on the lining covering the end face of the flange.

In an additional form of embodiment of the measuring tube, the flange includes on the end face at least one cavity, for example, in the form of a groove, which is at least partially covered and/or filled by the lining.

In an additional form of embodiment of the measuring tube, the lining includes at the height of the cavity in the flange a corresponding cavity. In this way, it is achieved that a maximum allowable compression, i.e. pressing force, is not exceeded, in order not to damage the seal.

As regards the magneto inductive, flow measuring device, the object is achieved by a magneto inductive, flow measuring device having a measuring tube according to one of the above forms of embodiment.

As regards the sealing ring free, flange connection, the object is achieved by a sealing ring free, flange connection between a measuring tube according to one of the above-mentioned forms of embodiment and an adjoining pipeline section.

As regards the method, the object is achieved by a method for manufacturing a measuring tube for a flow measuring device, wherein the measuring tube is lined with a lining, which has at least one sealing lip, which serves for establishing a sealing action between the measuring tube and an adjoining pipeline section. The sealing lip can, in such case, be introduced into the lining or placed in the lining during the lining procedure of the measuring tube. Alternatively, the sealing lip can also be introduced into the lining after the manufacturing of the lining. For example, the measuring tube and the flanges of the measuring tube can be provided with the lining and then the sealing lip prepared in the lining in the region of the flanges.

The proposed invention enables providing a measuring tube with a lining as well as at least one sealing lip integrated into the lining, in order to enable a simple installation of the measuring tube. Furthermore, the proposed invention enables lessening the thickness of flanges secured to the measuring tube, since, in the case of an exceeding of the predetermined tightening, a warping of the flange does not affect the sealing brought about by the seal.

BRIEF DESCRIPTION OF THE DRAWINGS

The invention will now be explained in greater detail based on the appended drawing, the figures of which show as follows:

FIG. 1b is a schematic representation of an enlarged detail of the flange connection of FIG. 1a;

FIG. 1c is a schematic representation of a further enlarged detail of the flange connection of FIG. 1a;

DETAILED DISCUSSION IN CONJUNCTION WITH THE DRAWINGS

Figure 1A:
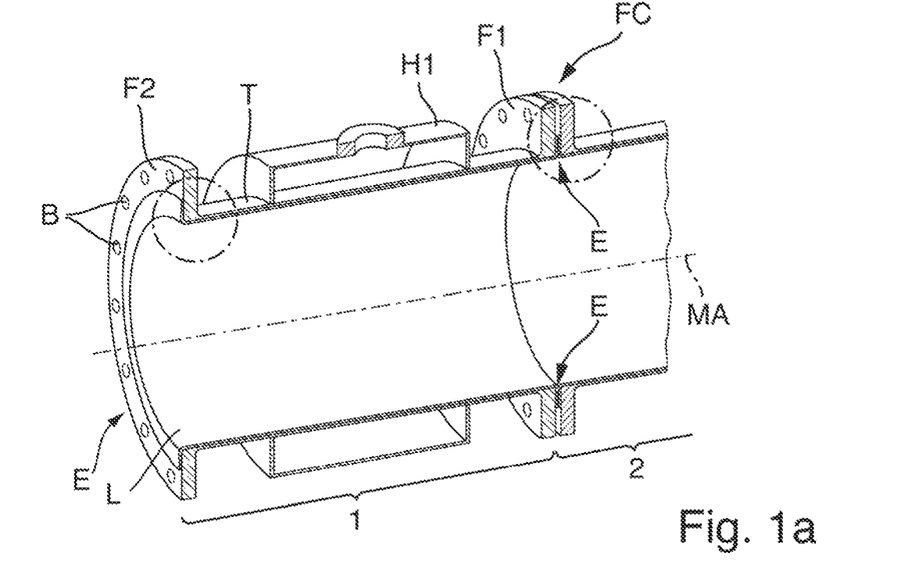
FIG. 1a is a schematic representation of a flange connection between a pipeline section and an adjoining measuring tube.

FIG. 1 shows a pipeline assembly, which is composed of a measuring tube 1 of a flow measuring device and an adjoining pipeline section 2.

Measuring tube 1 includes on its two ends flanges F1, F2, which serve to connect the measuring tube 1 with pipeline sections 2 adjoining the respective ends. Measuring tube 1 is, in such case, provided with a lining L. Lining L covers the lumen, i.e. the inner wall of the measuring tube 1, and extends, moreover, also onto a part of the end faces E of the flanges F1, F2 of the measuring tube 1.

Measuring tube 1 includes, furthermore, a support tube T, to which the lining L is applied. Provided on the ends of this support tube T is, in each case, a flange F1, F2. The flanges F1, F2 can either be welded to the ends of the support tube T or be formed from the upset ends of the support tube T. Furthermore, the support tube T shown in FIG. 1 includes half shells H1, in which a part of the measuring arrangement for determining the flow is accommodated. Typical such measuring arrangements utilize the principle of magneto inductive flow measurement or an ultrasound measuring principle. There are, however, also flow measuring devices known, which utilize, for example, the thermal principle or the so-called vortex measuring principle, in order to determine flow through the measuring tube 1. Also these have a measuring tube 1 with a lining L.

Lining L serves different purposes, depending on the flow measuring device and/or depending on measuring principle. Thus, for example, a lining L can be required, in order to convey a measured material, while meeting specified hygiene requirements, such as, for example, in the pharmaceuticals or foods industries.

Furthermore, it is required, for example, in the case of the magneto inductive flow measurement, to insulate the support tube T of the measuring tube 1 electrically from the measured material. To this end, known from the state of the art are linings L, so-called liners, which are composed of a synthetic material, or plastic, such as, for example, polyurethane.

As shown in FIG. 1, measuring tube 1 is not only lined in the interior with the lining L, but, instead, the lining L extends out beyond the end of the measuring tube 1 onto the flanges F1, F2 provided at the two ends of the measuring tube 1, so that the flanges F1, F2 are at least partially covered by the lining L. Further provided in the region, in which the flanges F1, F2 are covered by the lining L, is a seal S in the form of sealing lips S1, S2, Sn on the lining L, which serve for sealing the flange connection FC of the measuring tube 1, i.e. the flange connection between the measuring tube 1 and the respectively adjoining pipeline section 2.

The sealing lips S1, S2, Sn can be formed, in such case, for example, when the lining L is applied onto the support tube T or after the lining L has been applied, for example, by then modifying the form of the lining L.

Figure 1B:
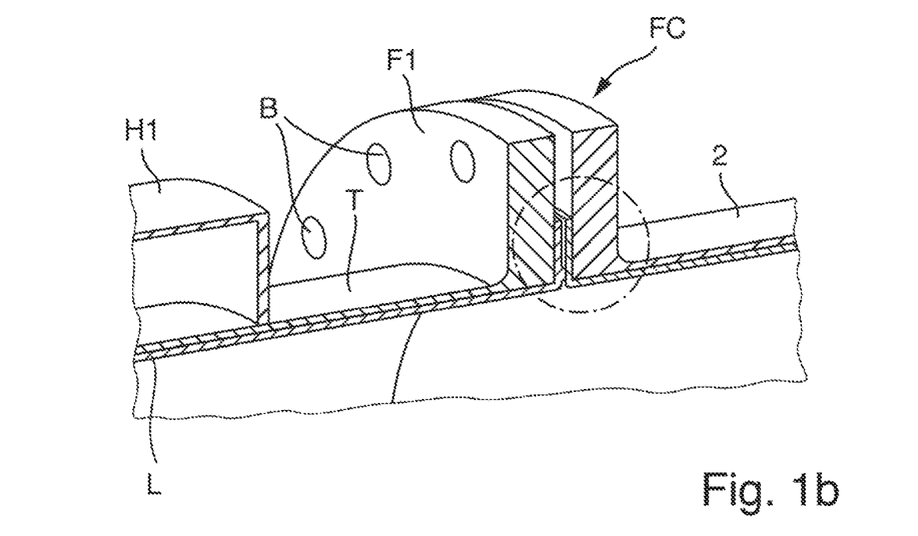

FIG. 1b shows an enlarged representation of the flange connection FC between the measuring tube 1 and the adjoining pipeline section 2. As in the case of the measuring tube 1 in the example of an embodiment shown in FIGS. 1a, 1b and 1c, also the adjoining pipeline section 2 is provided with a lining, in this case pipeline lining LP. It is, however, also possible that the adjoining pipeline sections 2 have no lining, i.e. are free of a lining.

Flange connection FC is produced, in such case, by tightening the respective flanges F1, F2 using connection bolts, which are inserted in corresponding bores B. The resulting pressing forces compress the sealing lips S1, S2, Sn and/or the lining L of the measuring tube 1 against the counterflanges CF of the adjoining pipeline sections 2, so that a sealing, surface pressure connection arises in the region of the flanges F1, F2, CF.

Figure 1C:
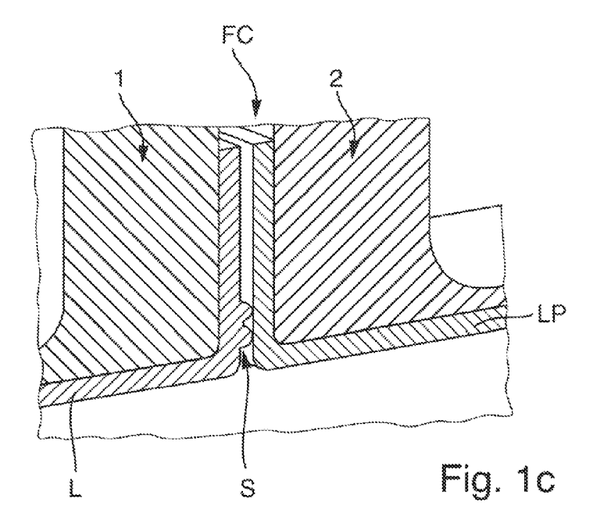

FIG. 1c shows a further enlarged representation of the areal compression between the measuring tube 1 and the adjoining pipeline section 2. Sealing lip S of the measuring tube 1 is composed in the example of an embodiment shown in FIG. 1c of two neighboring sealing lips S. These sealing lips S are deformed by the pressing force between the flanges F1, CF, so that they form sealing stages, which prevent escape of measured material at the flange connection FC.

Figures 2A, 2B, 2C:
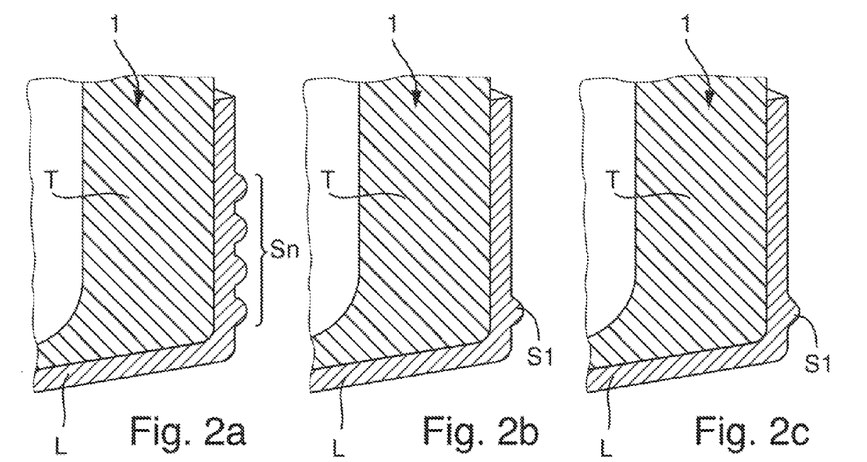
FIG. 2a is a schematic representation of a form of embodiment of the proposed invention having a plurality of sealing lips.
FIGS. 2b and 2c are each a schematic representation of a form of embodiment of the proposed invention with only one sealing lip.

FIG. 2a shows a sealing lip arrangement composed of a plurality of, here, equidistantly spaced, sealing lips Sn. The sealing lips Sn, in such case, all have essentially the same shape. The sealing lips Sn shown in FIG. 2a are, in such case, preferably arranged concentrically with the measuring tube axis and extend essentially in planes perpendicular to the measuring tube axis annularly on the end faces E of the flanges F1, F2 of the measuring tube 1. In this way, a number of sealing stages are formed, which prevent escape of measured material.

FIGS. 2b and 2c show a sealing arrangement, which is composed of a single sealing lip S1, which is integrated into the lining L of the measuring tube and is composed of the same material as the lining L.

Figure 3A:
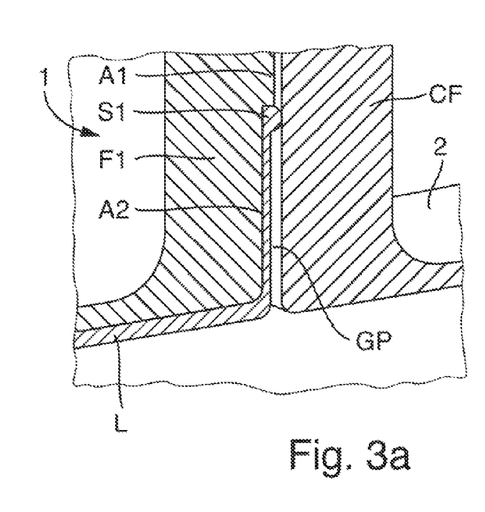
FIG. 3a is a schematic representation of a first form of embodiment of the proposed invention, in the case of which the sealing lip is provided in an end region of the lining.

FIG. 3a shows a sealing arrangement composed of a (single) sealing lip S1. Furthermore, the flange F1 of the measuring tube 1 shown in FIG. 3a includes a first area A1, i.e. a flat area, which is free of lining L and serves as a stop for the counterflange CF of the adjoining pipeline section 2. Flange F1 further includes a second area A2, which is covered by the lining L. Protruding from the lining L is a sealing lip S1. During connecting of the flanges F1, CF, these are drawn toward one another until the flange F1 of the measuring tube 1 with its first area A1, which is free of the lining L, contacts the counterflange CF. In this way, overloading of the seal S1 is prevented, since a defined gap GP is created, which is filled by the lining L, respectively the sealing lip S1. Furthermore, this prevents creep of the lining L.

Figure 3B:
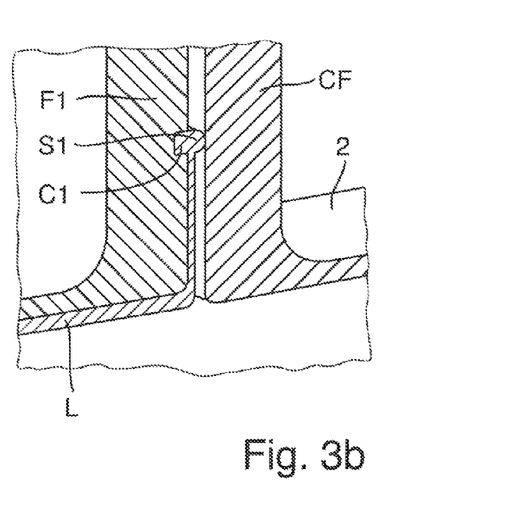
FIG. 3b is a schematic representation of a second form of embodiment of the proposed invention, in the case of which the sealing lip is provided in an end region of the lining covering the flange.

FIG. 3b shows another form of embodiment of a seal, in the case of which a (single) sealing lip S1 is provided. Flange F1 includes an area A2 covered by the lining L. Provided in the region of this area A2 is a cavity C1 in the form a groove in the flange F1. Opposite this groove C1, the lining L has a sealing lip S1, which protrudes outwards from the lining L. In this way, it can assured be that a sealing action is achieved, even when the flange F1 of the measuring tube 1 and the counterflange CF of the adjoining pipeline section 2 are not completely tightened. In the case, in which the flanges F1, CF are tightened until they cannot be brought any closer together, groove C1 assures that a defined sealing action is achieved. Furthermore, this means that the pressing force, with which the sealing action of the sealing lip S1 is achieved, is essentially independent of the force transferred via the flange connection FC.

Figure 3C:
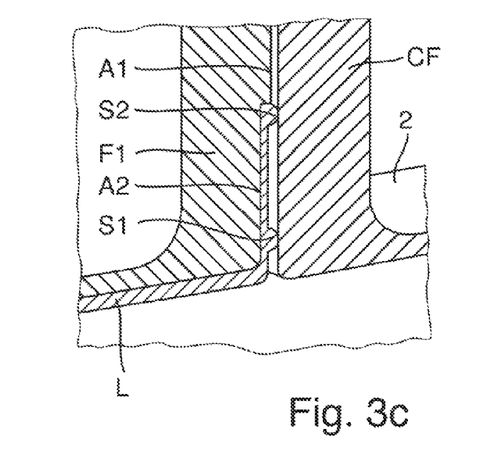
FIG. 3c is a schematic representation of a third form of embodiment of the proposed invention, in the case of which two sealing lips of different size are provided.

FIG. 3c shows a seal composed of two sealing lips S1, S2 of different size. The sizes of the sealing lips S1, S2 can be determined, in such case, based on the radius, respectively diameter, of the cross sectionally circular arc shaped surface of the sealing lip S1, respectively S2. This permits achievement of redundant sealing. The second sealing lip S2 is, in such case, arranged on the end of the lining L located on the flange F1. Furthermore, the second sealing lip S2 borders directly on the shoulder where the first area A1 of the flange F1, which is free of the lining L, connects with the second area A2 of the flange F1 covered by the lining L. The first sealing lip S1, which has a greater diameter than the second sealing lip S2, is arranged nearer to the measuring tube axis than the second sealing lip S2.

Figure 3D:
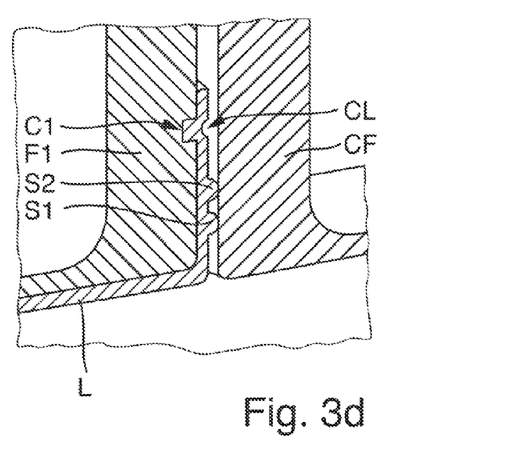
FIG. 3d is a schematic representation of a fourth form of embodiment of the proposed invention, in the case of which a cavity in the lining and two sealing lips are provided.

FIG. 3d shows a seal, which has a cavity C1 in the form of a groove located in the flange F1 of the measuring tube 1 and filled by the lining L. Opposite the groove C1, a cavity CL is provided on the surface of the lining. Cavity CL is, in such case, likewise embodied with a circular arc shape. Furthermore, two sealing lips S1, S2 are provided on the lining L covering the end face a of the flange F1. This arrangement also enables compensation of an above-normal pressing force between the flanges F1, CF, in order that the seal not be damaged and leak. The sealing lips S1, S2 additionally can compensate a pressing force that is too low.

Figure 3E:
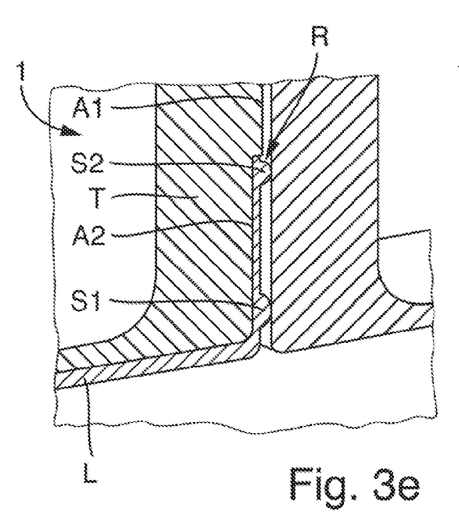
FIG. 3e is a schematic representation of a fifth form of embodiment of the proposed invention, in the case of which two sealing lips of different size are provided, wherein the volume of the upper sealing lip is adapted to the gap between the measuring tube flange and the counterflange of the adjoining pipeline section.
Figure 3F:
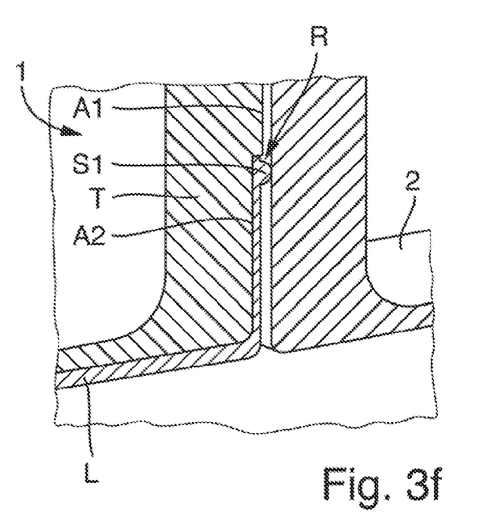
FIG. 3f is a schematic representation of a sixth form of embodiment of the proposed invention, in the case of which only one sealing lip is provided, wherein the volume of the sealing lip is adapted to the gap between the measuring tube flange and the counterflange of the adjoining pipeline section.

FIG. 3e shows another form of embodiment of a proposed flange seal. In such case, a first sealing lip S1 is provided on the lining L covering the end face E of the flange F1 and is larger than a second, remote sealing lip S2 farther than the first sealing lip S1 from the measuring tube axis. Flange F1 includes, in such case, a shoulder, via which a second area A2 of the flange covered by the lining is connected with a first area A1, which is free of lining L. The second sealing lip S2 is, in such case, isolated from the shoulder by a predetermined separation. Furthermore, there is provided in this region between the shoulder and the second sealing lip S2 a gap R, which is composed, for example, of a cavity in the lining L. Gap R serves as a reservoir, in order when the flanges F1, CF are tightened until they cannot be brought any closer together, an overloading of the seal, especially of the second sealing lip S2, is prevented.

The invention claimed is:

1. A measuring tube for a flow measuring device, the measuring tube has a lining, wherein:
    said lining has at least one sealing lip, which serves to provide a sealing action between the measuring tube and a pipeline section adjoining the measuring tube in the installed state,
    the measuring tube includes at least one flange, which serves for connection of the measuring tube with the adjoining pipeline section;
    said lining covers at least a part of said flange;
    said at least one sealing lip is located in a part of said lining covering said flange;
    said flange includes a first area, which is free of said lining and which serves as a stop for a counterflange of the adjoining pipeline section;
    said flange includes an end face, which is at least partially covered by said lining; and
    said sealing lip protrudes outwards from said lining on said end face, in the direction of the adjoining pipeline section.

2. The measuring tube as claimed in claim 1, wherein:
    said lining and said sealing lip, when the measuring tube is connected with the adjoining pipeline section, serve to produce the sealing action essentially by a bearing pressure against the adjoining pipeline section.

3. The measuring tube as claimed in claim 1, wherein:
    said flange includes a second area, which is connected with said stop preferably via a shoulder, covered by said lining and offset from said first area preferably in the direction of the measuring tube axis.

4. The measuring tube as claimed in claim 3, wherein:
    at least one of said lining and[/or] said sealing lip protrudes at least partially above a height predetermined by said first area and given preferably by the intersection between said first area and the measuring tube axis.

5. The measuring tube as claimed in claim 1, wherein:
    said at least one sealing lip has an essentially circularly shaped cross section.

6. The measuring tube as claimed in claim 1, wherein:
    said at least one sealing lip is a component of said lining.

7. The measuring tube as claimed in claim 1, wherein:
    said sealing lip is composed of the same material as said lining.

8. The measuring tube as claimed in claim 1, wherein:
    a plurality of sealing lips, especially annular sealing lips, are provided.

9. The measuring tube as claimed in claim 1, wherein:
    a first sealing lip and a second sealing lip are provided, which are spaced with different separations from the measuring tube axis; and
    preferably said second sealing lip is spaced farther from the measuring tube axis than said first sealing lip.

10. The measuring tube as claimed in claim 1, wherein:
    the maximum diameter of said first sealing lip is greater than the maximum diameter of said second sealing lip.

11. The measuring tube as claimed in claim 10, wherein:
    said sealing lips form annular corrugations on said lining covering the end face of said flange.

12. The measuring tube as claimed in claim 11, wherein:
    said flange includes on the end face at least one cavity, which is at least partially covered and/or filled by said lining.

13. The measuring tube as claimed in claim 12, wherein:
    said lining includes at the height of said cavity in said flange a corresponding cavity, for example, a cavity on the side of said lining facing the adjoining pipeline section, respectively on the side of said lining facing the flange of the adjoining pipeline section.

14. A magneto inductive, flow measuring device having a measuring tube as claimed in claim 1.

15. A sealing ring free, flange connection between a measuring tube as claimed in claim 1 and an adjoining pipeline section.

16. A method for manufacturing a measuring tube for a flow measuring device, comprising the steps of:
    lining the measuring tube with a lining, which has at least one sealing lip; and
    applying a sealing action between the measuring tube and an adjoining pipeline.

\* \* \* \* \*